Figure 2:
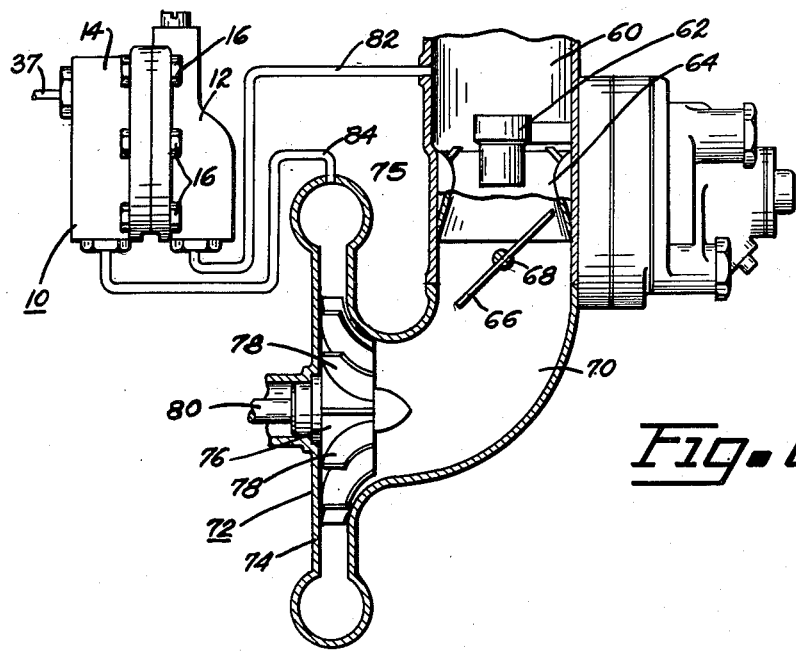

April 5, 1949.                    E. G. KELLER                    2,466,441
                        PRESSURE RESPONSIVE SELECTOR VALVE
Filed Sept. 1, 1943                                        2 Sheets-Sheet 1

INVENTOR
EDWIN G. KELLER
BY J. C. Baisch

April 5, 1949.   E. G. KELLER   2,466,441
PRESSURE RESPONSIVE SELECTOR VALVE
Filed Sept. 1, 1943   2 Sheets-Sheet 2
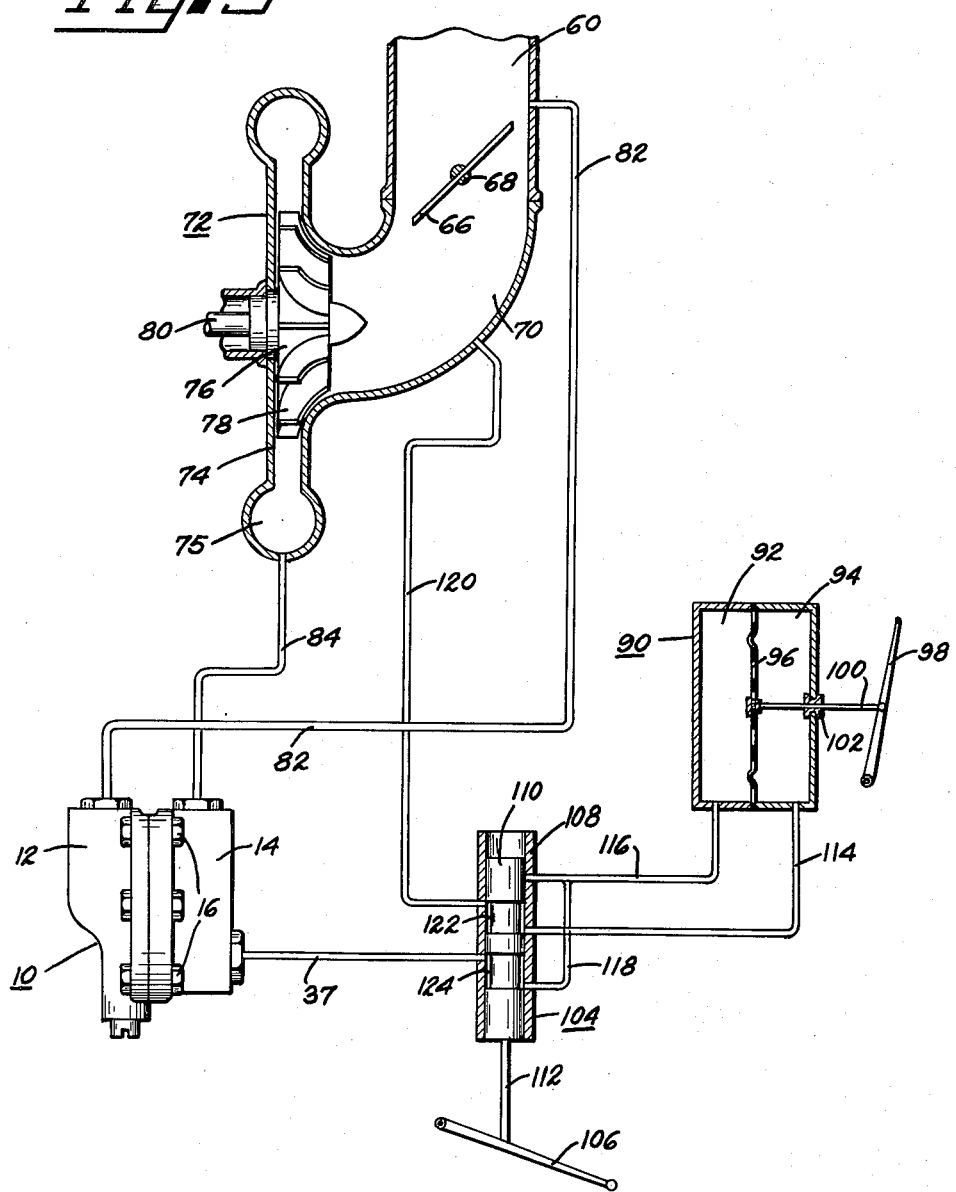
INVENTOR
EDWIN G. KELLER Patented Apr. 5, 1949

2,466,441

UNITED STATES PATENT OFFICE 2,466,441

PRESSURE RESPONSIVE SELECTOR VALVE

Edwin G. Keller, South Bend, Ind., assignor to Bendix Aviation Corporation, South Bend, Ind., a corporation of Delaware Application September 1, 1943, Serial No. 500,744

8 Claims. (Cl. 60—60)

This invention in its broader aspects relates to valves and more particularly to automatic selector valves for use in fluid pressure control systems and the like.

Selector valves of various types for selecting one of a plurality of available pressures, each of which may vary considerably in value, for actuating one or more pressure responsive devices have been heretofore proposed but generally are of such character that it has been necessary to control them manually, an arrangement which has a number of disadvantages, one of which being that there are times when the operator does not know which of the pressures is the highest so that proper selection thereof is difficult or impossible.

It is therefore an important object of the present invention to provide a valve adapted to automatically select one of a plurality of variable fluid pressures in a fluid pressure system for the actuation of a fluid pressure responsive device.

Another object of the invention is to provide a device of this character adapted to automatically select the highest of a plurality of fluid pressures of a fluid pressure system for actuation of a pressure responsive device.

It is another object of the invention to provide a valve device of this character that is operable by the differential of the said variable pressures.

It is another object of the invention to provide a valve of this character wherein the moving part of the valve is relatively light in weight and therefore possesses relatively little inertia so as to be operable by extremely low pressure differentials.

Still another object of the invention is to provide a valve of this character having means for insuring actuation of the movable valve member from one valve seat to another.

A further object of the invention is to provide a device of this character wherein the movable valve part or member comprises a flexible diaphragm.

A still further object of the invention is to provide a device of this character that is simple in construction and effective and reliable in operation.

The characteristics and advantages of the invention are further sufficiently referred to in connection with the accompanying drawings, which represent a preferred embodiment of said invention. After considering this example skilled persons will understand that many variations may be made without departing from the principles disclosed; and I contemplate the employment of any structures, arrangements, or modes of operation that are properly within the scope of the appended claims.

Figure 1:
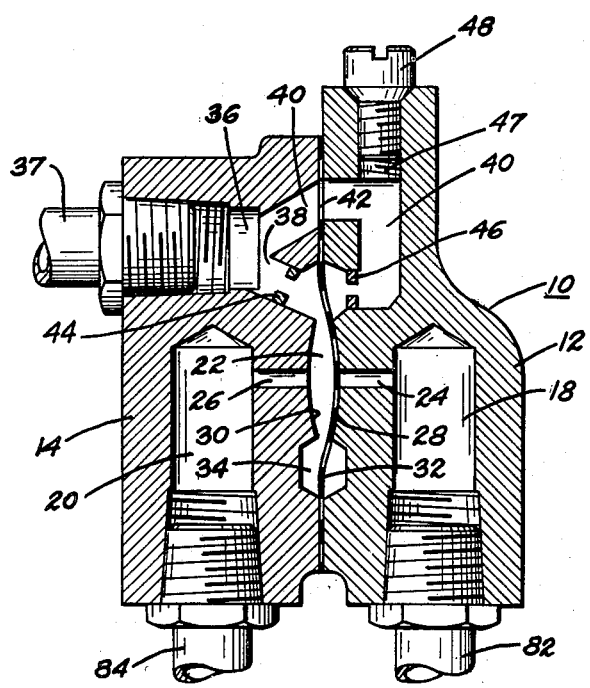

In the drawings:

Figure 1 is a section through a selector valve embodying the present invention;

Figure 2 is a diagrammatic view, partially in section, of an arrangement utilizing the present invention wherein a carburetor-supercharger system supplies the pressures for actuating a pressure responsive device; and Figure 3 is a diagrammatic view, partially in section, of a fluid pressure system incorporating the present invention and including a pressure responsive device adapted to be actuated by pressures supplied by a carburetor-supercharger system.

Referring first to Figure 1, the selector valve, indicated generally at 10, comprises a pair of casing members 12 and 14 respectively, secured together by bolts 16. The casing members 12 and 14 provide a valve body having passages 18 and 20 which extend into said valve body in parallel relationship with respect to each other and are each adapted to be connected with a source of variable pressure as described hereinafter. An annular valve chamber 22 is disposed between the passages 18 and 20 and connected therewith by respective passages 24 and 26, said valve chamber having oppositely disposed concave valve seats 28 and 30 respectively. A flexible diaphragm 32 is marginally clamped between the casing members 12 and 14 and extends through the valve chamber 22, being so arranged that it is adapted to be seated on one of the valve seats when the pressure on one side thereof is higher than the pressure on the other side. The valve chamber also includes an enlarged annular portion 34 thereabout which insures free movement of the diaphragm in said chamber. The selector valve body is also provided with a fluid passage 36 having a conduit 37 connected therewith for transmitting pressure to a pressure responsive device as hereinafter described. The passage 36 has branch passages 38 and 40 which communicate with the portion 34 of the valve chamber 22 on opposite sides of the diaphragm, there being an opening 42 in the diaphragm 32 to permit the flow of fluid through branch passage 40. The branch passages may, if desired, be provided with restrictions 44 and 46 respectively to increase the sensitivity or responsiveness of the selector valve diaphragm. The valve 10 is provided with an additional outlet passage 47 which may be connected to a second pressure responsive device, and is adapted to be closed by a plug 48 when not in use.

Operation of the selector valve

As pointed out above the diaphragm 32 of the selector valve 10 is operable by a differential of pressures on opposite sides thereof and should the pressure in passage 18 be lower than the pressure in passage 20 the differential of said pressures will cause the diaphragm to seat on the valve seat 28 as shown in Figure 1. With the diaphragm in this position the passage 20 is in communication with the passage 36, by way of passage 38, which is connected with a pressure responsive device, and the passage 18 is cut off from communication with said passage 36 by the diaphragm which closes passage 24. Therefore the higher pressure in passage 20 is made available to actuate said pressure responsive device. However, should the pressure in passage 18 become greater than the pressure in the passage 20, the diaphragm 32 will move to the left and seat on valve 30 so that passage 18 is in communication with passage 36 and passage 20 is cut off therefrom, and again the higher of the two pressures is made available to actuate the pressure responsive device.

The restrictions 44 and 46 in the respective branch passages 38 and 40 are provided to insure the seating of the diaphragm on one valve seat or the other during a changeover. For example, assume first that the pressure in passage 20 is greater than in passage 18 so that the diaphragm is positioned as shown in Figure 1. Now, should the pressure in passage 18 become greater than the pressure in passage 20 the differential of pressures on opposite sides of the diaphragm will cause said diaphragm to move to the left. If passages 38 and 40 were unrestricted the increased pressure in passage 18 might be transmitted through passages 38 and 40 to the left side of the diaphragm with sufficient rapidity to create a condition in valve chamber 22 wherein the pressure on both sides of the diaphragm tend to be substantially the same over substantially equal areas of said diaphragm, thus preventing the diaphragm from seating on valve seat 30. However, with the restrictions 44 and 46 in the branch passages 38 and 40 the full value of the increase of pressure on the right side of the diaphragm is prevented from being transmitted to the other side until said diaphragm has completed its movement from seat 28 to seat 30. Thereafter the area on the right side of the diaphragm which is subjected to the higher pressure of passage 18 is greater than the area on the left side which is subjected to said higher pressure, the former area being defined by the periphery of the valve chamber 22 and annular portion 34 thereof whereas the latter area is only that defined by said portion 34. Consequently the diaphragm will remain seated on seat 30 once it has made the changeover and vice versa when the reverse action occurs. It is to be noted however that while the restrictions 44 and 46 may be arranged as shown they may also be otherwise arranged or but one restriction in one of the branch passages may be used.

Referring now to Figure 2, there is shown a carburetor having an induction passage with an air entrance 60 which as shown by way of example, is open to atmosphere. Within the induction passage is a small venturi 62 and a large venturi 64 posterior to which is a throttle valve 66 mounted in the usual manner on a throttle shaft 68. The induction passage is connected by a conduit 70 with a supercharger, indicated generally at 72, which may be of any well known type but which is shown as comprising a casing 74 having an outlet passage 75. Within the casing 74 is operably disposed a spinner 76 having the usual radially extending vanes 78 for providing pressure in the usual manner, said spinner being driven by any suitable source of power, such as an internal combustion engine, not shown, and connected therewith by means of a shaft 80. A conduit or pipe 82 connects passage 18 of the selector valve with the induction passage inlet or entrance 60 and a conduit or pipe 84 connects passage 20 of said selector valve with the supercharger outlet 75. Thus the selector valve passages 18 and 20 are each connected with a source of variable pressure which may be used to operate a pressure responsive devise according to which of said pressure sources is the higher, it being understood that any other suitable sources of variable pressures may be used if desired. With the arrangement shown, it will be understood that at low power output of the engine the pressure in the entrance 60 will exceed that at the supercharger outlet whereas at high power output, and in the case of aircraft engines at high altitude, the pressure in the supercharger outlet 75 will be higher. The selector valve 10 will automatically select and pass to the pressure actuated device, the higher of the two pressures.

In Figure 3 a pressure responsive device is indicated generally at 90 and includes chambers 92 and 94 separated by a flexible diaphragm 96 which is connected to a lever 98 by means of a rod 100. The lever 98 represents diagrammatically the actuating member of any device to be operated, such for example as a supercharger shift control or any other type of control or device. A packing gland 102 of any well known character seals the device against loss of pressure past the rod 100. A valve, indicated generally at 104, includes a valve casing 108 with a slidable plunger 110 therein, said plunger being connected with a lever 106 by means of a rod 112 whereby the valve is controlled manually although it may be controlled by any suitable automatic means if desired. The chamber 94 of the pressure responsive device 90 is connected with the interior of the casing 108 by means of a conduit 114 and the chamber 92 is connected with said casing 108 at one side of the conduit 114 by a conduit 116 and at the other side by a branch conduit 118, said connections of conduits 114, 116 and 118 with the casing 108 being longitudinally spaced with respect thereto. A conduit 120 is connected with the carburetor induction passage 70 posterior to the throttle valve 66 and communicates with the casing 108 of valve 104 at a point intermediate the connection with said casing of the conduits 114 and 118. Conduit 37 from the selector valve 10 is also connected with the casing 108, at a point intermediate the connection with said casing 108 of conduits 114 and 118. The plunger 110 of the valve 104 is provided with a pair of annular grooves 122 and 124 which are spaced longitudinally apart relative to the plunger 110 and provide connecting passageways between the conduits 120 and 37 and the conduits 114 and 118 or 116 and 114 respectively in accordance with the position of the plunger 110. By this arrangement the pressures on the diaphragm 96 of the pressure responsive device 90 may be controlled to operate the lever 98 in either direction according to the position of the plunger 110 of the valve 104.

*Operation of arrangement shown in Figure 3*

With the foregoing in view reference is made to Figure 3 wherein the selector valve 10 is incorporated in a pressure system which includes a plurality of sources of variable pressures and a pressure responsive device. In this system conduit 82 is connected with the inlet 60 of the carburetor induction passage which opens to atmosphere, although the inlet may open in the direction of travel to be subjected to impact pressures caused for example by the velocity of the aircraft. Consequently the pressure supplied by pipe or conduit 82 is substantially equal to or somewhat greater than atmospheric pressure at all times. The pressure in the connection 70 is extremely variable and depends primarily upon the position of the throttle valve 66 and the speed of the engine. As shown in Figure 3 this conduit 70 is connected by the conduit 120 to chamber 94 of the pressure responsive device. The pressure at the supercharger outlet 75 is also variable and depends on the pressure in the connection 70 and the speed of the supercharger spinner, said supercharger outlet being connected with the selector valve 10 by the conduit 84.

Assuming that the throttle valve 66 is fully closed as at idle operation, the pressure in the carburetor inlet 60 will be substantially atmospheric and will be greater than the pressure at the supercharger outlet 75, due to the fact that very little air will pass the throttle valve and the pressure in passage 70 will therefore be very low. Consequently the pressure in the passage 18, of the selector valve 10 will be greater than that in the passage 20 of said valve so that the diaphragm 32 will seat on the valve seat 30. The atmospheric pressure of passage 18 will therefore be transmitted by way of branch passage 40 to passage 36 and conduit 37 and thence through the valve 104 to branch conduit 118, conduit 116 and chamber 92 of the pressure responsive device 90. Under these conditions the pressure in the connection 70 which is transmitted to chamber 94 by means of conduits 120, 122 and 114 is substantially lower than the pressure in the chamber 92 which is derived from the air inlet 60 so that the diaphragm 96 will remove to the right, as shown in the drawings, and impart a corresponding movement to the lever 98.

Should the throttle valve 66 be substantially fully opened the pressures in the inlet 60 and the connection 70 will be substantially the same and will be approximately atmospheric pressure. However, the supercharger will now be supplied with substantially an unrestricted supply of air and will build up an outlet pressure substantially greater than atmospheric pressure which will result in actuation of the diaphragm 32 of the selector valve 10 so that said diaphragm will engage the valve seat 28 and be in the position shown in Figure 2. The pressure in chamber 92 of the pressure responsive device 90 will still be greater than the pressure in chamber 94 so that the diaphragm 96 will still be urged to the right. Movement of the lever 98 to the left is effected by the control valve 104, the plunger 110 thereof being moved upwardly by lever 106 so that the annular passages 122 and 120 of said plunger 110 connect together the conduits 120 and 116 and the conduits 37 and 114 instead of the conduits 120 and 114 and the conduits 37 and 118. This reverses the pressures applied to the opposite sides of diaphragm 96, the higher pressure now being present in chamber 94, and the lever 98 will be moved to the left or in a counterclockwise direction.

Adjustment of the throttle valve 66 to intermediate positions will vary the pressures in the connection 70 and the supercharger outlet 75 in accordance with such adjustments and when the throttle valve is in certain of its intermediate positions the pressure differential between the inlet 60 and the supercharger outlet 75 will be very slight but due to the light weight of the diaphragm and its relatively great flexibility even such slight pressure differentials will actuate same so that the highest pressure will at all times be made available to actuate the pressure responsive device 90.

The present invention may be used in numerous pressure systems having a plurality of variable pressures although, as above pointed out, an important application of the invention is in connection with boost controls for aircraft carburetors. It is also to be understood that the selector valve may be used in pressure systems employing fluids other than air, such as systems employing hydraulic fluids.

It is thought that the invention and many of its attendant advantages will be understood from the foregoing description and it will be apparent that various changes may be made in the form, construction and arrangement of the parts without departing from the spirit and scope of the invention or sacrificing all of its material advantages.

I claim:

1. In a pressure control system: a plurality of sources of variable pressure; a selector valve having a valve chamber; a flexible diaphragm within the valve chamber separating said chamber into a plurality of compartments; means adapted to connect each compartment with one of the sources of variable pressure, each of said means communicating with the respective compartments of the valve chamber through oppositely disposed ports; a valve seat about each port adapted to be engaged by the diaphragm; a conduit adapted to be connected with a pressure responsive device; passageways connecting the conduit with both of the compartments and restricting means in each of said passageways.

2. In a pressure control system: a plurality of sources of variable pressure; a selector valve having a valve chamber; a flexible diaphragm within the valve chamber separating said chamber into a plurality of compartments; means adapted to connect each compartment with one of the sources of variable pressure and communicating with the respective compartments through oppositely disposed ports; a valve seat about each port adapted to be engaged by the diaphragm; a conduit adapted to be connected with a pressure responsive device; passageways connecting the conduit with the respective compartments, said passageways providing a connection between the compartments; and restricting means in at least one of said passageways adapted to restrict the transmission of pressure from one compartment of the valve chamber to the other.

3. In a pressure control system: a carburetor having an air inlet and a mixture outlet; a throttle valve controlling the mixture outlet; a supercharger having an inlet and an outlet; a conduit connecting the carburetor outlet with the inlet of the supercharger; a pressure responsive device having a chamber therein; a diaphragm in said chamber adapted to divide same into a pair of pressure compartments; means adapted to connect the diaphragm with a device to be actuated; a pipe conecting the conduit between the carburetor and the supercharger with one of said compartments; a selector valve connected with the other of said compartments, said selector valve comprising a valve chamber; oppositely disposed valve seats; and a flexible diaphragm within the valve chamber separating said chamber into a plurality of parts and adapted to seat on one or the other of said valve seats; a connection betwen each part of the valve chamber of the selector valve and the pressure responsive device; means connecting the carburetor inlet anterior to the throttle with one part of the valve chamber and terminating in a port in the respective valve seat; means connecting the supercharger outlet with the other part of valve chamber and terminating in a port in the other valve seat, said diaphragm being adapted to be actuated by a differential of pressures on opposite sides thereof and to selectively control the pressures from the carburetor inlet and the supercharger outlet by seating on one or the other of the valve seats to make available the highest of said pressures for actuating the pressure responsive device.

4. The device defined by claim 3 and including a valve controlling the connections between the sources of pressures and the pressure responsive device whereby the pressures supplied by said sources to said pressure responsive device may be reversed with respect to the compartments thereof.

5. In a selector valve: a valve chamber; fluid passages communicating with the chamber at opposite sides thereof; a flexible diaphragm disposed within the chamber dividing same into two parts and adapted to be actuated by the differential of pressures on opposite sides thereof to close one or the other of the fluid passages; a fluid conduit connected with both parts of the valve chamber and adapted to bypass fluid about the diaphragm from one part of the chamber to the other; and means for restricting the flow of fluid from one part of said valve chamber to the other.

6. In a selector valve: a valve chamber; a flexible diaphragm within the valve chamber dividing said chamber into two portions; conduits adapted to connect each portion of the valve chamber with a source of variable pressure, said diaphragm being adapted to control said conduits in accordance with the differential of pressures from said sources; a passage adapted to be connected with a pressure responsive device; branch passages from said passage communicating with each portion of the valve chamber and so arranged as to form a fluid connection between said portions, and a restricted orifice in each branch passage.

7. In a selector valve: a pair of body members secured together to provide a valve body; a valve chamber formed in said body; a flexible diaphragm secured between the body members and extending through the valve chamber, said diaphragm being relatively loosely disposed in the valve chamber and dividing same into a plurality of compartments and adapted to be actuated by differential of pressures on opposite sides thereof; a concave seat in each portion of the valve chamber and facing each other, said seats being adapted to be engaged alternately by the diaphragm; a conduit communicating with each portion of the valve chamber by means of a port located in the respective valve seats, each conduit being adapted to be connected with a source of variable pressure; a passage adapted to be connected with a pressure responsive device; a restricted branch passage connecting the first mentioned passage with one portion of the valve chamber; and a second restricted branch passage connecting the first mentioned passage with the other portion of the valve chamber, said branch passages comprising a bypass about the diaphragm from one portion of the valve chamber to the other.

8. In a pressure control system: a carburetor having an induction passage with an air inlet and a mixture outlet; a throttle valve controlling the induction passage; a supercharger having an inlet and an outlet; a conduit connecting the carburetor outlet with the inlet of the supercharger; a selector valve comprising a valve chamber; a flexible diaphragm within the chamber dividing same into two compartments; a fluid connection between one chamber and the induction passage anterior to the throttle valve; a fluid connection between the other compartment and the supercharger outlet, posterior to the throttle valve; a conduit adapted to be connected with a pressure responsive device; branch passages from said conduit communicating with respective compartments of the valve chamber and so arranged as to form a fluid connection between said chambers; and means for restricting the flow of fluid from one chamber to the other.

EDWIN G. KELLER.

REFERENCES CITED

The following references are of record in the file of this patent:

UNITED STATES PATENTS

| Number | Name | Date |
|---|---|---|
| 1,199,840 | Turner | Oct. 3, 1916 |
| 1,581,595 | Osborne | Apr. 20, 1926 |
| 1,800,157 | Saunders | Apr. 7, 1931 |
| 2,017,086 | Zouck | Oct. 15, 1935 |
| 2,123,356 | Glynn | July 12, 1938 |
| 2,138,989 | Thomas | Dec. 6, 1938 |
| 2,216,855 | Sanford | Oct. 8, 1940 |
| 2,223,381 | Mock | Dec. 3, 1940 |

FOREIGN PATENTS

| Number | Country | Date |
|---|---|---|
| 346,503 | Great Britain | 1931 |
| 348,868 | Great Britain | 1931 |